United States Patent
Soryal et al.

(10) Patent No.: US 12,335,735 B2
(45) Date of Patent: Jun. 17, 2025

(54) FAKE NETWORK-UTILIZATION DETECTION FOR INDEPENDENT CELLULAR ACCESS POINTS

(71) Applicant: AT&T Intellectual Property I, L.P., Atlanta, GA (US)

(72) Inventors: Joseph Soryal, Glendale, NY (US); Howard L. Lang, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 450 days.

(21) Appl. No.: 17/953,970

(22) Filed: Sep. 27, 2022

(65) Prior Publication Data
US 2024/0107314 A1  Mar. 28, 2024

(51) Int. Cl.
*H04W 12/10* (2021.01)
*H04W 12/122* (2021.01)

(52) U.S. Cl.
CPC ......... *H04W 12/122* (2021.01); *H04W 12/10* (2013.01)

(58) Field of Classification Search
CPC .................................................. H04W 12/10
See application file for complete search history.

(56) References Cited

U.S. PATENT DOCUMENTS

| | | | |
|---|---|---|---|
| 12,074,906 B1* | 8/2024 | Mohan | H04L 63/0272 |
| 2015/0074259 A1* | 3/2015 | Ansari | H04L 12/2898 709/224 |
| 2019/0335333 A1* | 10/2019 | Sohail | H04W 12/06 |

OTHER PUBLICATIONS

Freedom-Fi Gateway, brochure-datasheet, Helium, accessed Aug. 29, 2022 from https://freedomfi.com/, 2 pages.
Mine HNT, "Helium Hotspots mine $HNT and are built by our growing ecosystem of approved manufacturers", accessed on Aug. 2, 2022 from https://docs.helium.com/mine-hnt/, 3 pages.
Haleem, A., et al., "Helium A Decentralized Machine Network", Computer Science, 2018, 20 pages.

* cited by examiner

*Primary Examiner* — Michael T Vu (57) ABSTRACT

A processing system including at least one processor may obtain network traffic data associated with an independent gateway that is connected to a telecommunication network, apply an input data set associated with the network traffic data of the independent gateway to at least a first detection model implemented by the processing system for detecting fake network usage, and may determine the fake network usage associated with the independent gateway from the input data set associated with the network traffic data of the independent gateway via the at least the first detection model. The processing system may then generate an alert of the fake network usage associated with the independent gateway, where the alert is generated in response to the determining.

20 Claims, 3 Drawing Sheets

FAKE NETWORK-UTILIZATION DETECTION FOR INDEPENDENT CELLULAR ACCESS POINTS

The present disclosure relates generally to endpoint device and telecommunication network security, and more particularly to methods, non-transitory computer-readable media, and apparatuses for determining fake network usage associated with an independent gateway from an input data set associated with network traffic data of the independent gateway via at least a first detection model.

BACKGROUND

Small cells and wireless access points are expected to play an increasing role in Fifth Generation (5G) networks. However, wireless access points and small cells may be deployed at customer premises, and may therefore be more vulnerable to tampering and similar communication security breaches.

SUMMARY

Methods, computer-readable media, and apparatuses for determining fake network usage associated with an independent gateway from an input data set associated with network traffic data of the independent gateway via at least a first detection model are described. For example, a processing system including at least one processor may obtain network traffic data associated with an independent gateway that is connected to a telecommunication network, apply an input data set associated with the network traffic data of the independent gateway to at least a first detection model implemented by the processing system for detecting fake network usage, and may determine the fake network usage associated with the independent gateway from the input data set associated with the network traffic data of the independent gateway via the at least the first detection model. The processing system may then generate an alert of the fake network usage associated with the independent gateway, where the alert is generated in response to the determining.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses servers, computer-readable media, and methods for determining fake network usage associated with an independent gateway from an input data set associated with network traffic data of the independent gateway via at least a first detection model. For example, decentralized cellular access points, or "independent gateways" may be owned by individuals or enterprises, and may interface with and provide access to a cellular core network. In one example, independent gateway owners may earn rewards (e.g., monetary rewards, cryptocurrency, discounts/offsets of subscriber network access fees, etc.) based on the volume of data carried by each independent gateway, such as a number of dollars, cents, and/or tokens for each gigabyte (GB) of data, for instance. However, insofar as a telecommunication network may offer unlimited data plans to cellular subscribers, an independent gateway owner may devise a scheme to "pump" a large amount of data through the independent gateway using one or more phones or other cellular endpoint devices. For instance, the owner or other entities in coordination with the owner may cause data to be streamed (e.g., at maximum throughput) using such devices (e.g., on unlimited data plans) for the sole purpose of earning cryptocurrency or other rewards. In short, there may be financial incentive to pump "unlimited" data, even if it is not actually needed by the subscriber.

Moreover, colluding malicious entities may decide to game the system by creating web/mobile applications that simulate mobile phones and/or other cellular devices to generate un-needed data traffic, such as streaming and/or downloading the same video clip repeatedly, and force the data traffic through the independent gateway to gain rewards. Alternatively, or in addition, a malicious entity may employ subscriber identity module (SIM) boxing or similar techniques, e.g., where a box full of SIM cards makes calls, data requests, etc. simultaneously that are forced to go through the independent gateway. Likewise, to further increase the data utilization a mobile phone, for example, with an unlimited data plan may be used in "tethering/personal hotspot" mode, to support several connected applications running concurrently on additional devices, such as laptop computers, etc., to force large data usage.

Examples of the present disclosure collect and process network traffic data to detect an individual or collective malicious entities attempting to utilize unlimited wireless data plans for the primary purpose of earning cryptocurrency or other rewards via data "pumping" at an independent gateway. In particular, in one example, the present disclosure may process network data utilization measurements (e.g., from endpoint devices, from the independent gateway, and/or from entities in the telecommunication network (e.g., cellular core network components)) as inputs to one or more detection models for detecting fake network utilization. In one example, the present disclosure may apply caps on financial or other rewards, without capping data usage permitted by subscribers' data plans.

In one example, the present disclosure may comprise a fake network utilization detection application (or an anti-gaming application (AGA)) that may be installed in the independent gateway or within the cellular network, such as within a security gateway (SeGW). In one example, the AGA may be configured to monitor for usage by an individual (or group of colluding endpoint devices) that exceeds a threshold, such as an established baseline for the individual or the group (which may be further refined by location, time of day, day of the week, etc.). In one example, the AGA may analyze traffic streams via an independent gateway to determine if the same video clip(s) or other content is being reused. For instance, this may include sampling streams and identifying repeating and/or periodic patterns. For instance, a machine learning-based module may take periodic samples of each stream and check for similarities. Alternatively, or in addition, the AGA may perform traffic analysis, e.g., applying a machine learning-based module on encrypted network traffic data to identify matches for audio, video, or other content signatures.

In addition, the AGA may look for and flag potentially unrealistic usage (e.g., two streaming services simultaneously on a single device, without tethering, or a number of streams in excess of an allowed number of tethered devices for an endpoint device functioning as a mobile hotspot plus one (e.g., four, five, etc.). In one example, this alone may not be sufficient to be considered fake network utilization. However, in combination with excessing usage, such as non-stop, continuous usage for 24 to 48 hours, this may be indicative of fake network utilization. In one example, the AGA may alternatively or additionally engage in endpoint device location estimation and correlation to see if multiple network traffic streams are coming from the same source, such as a computer that is emulating multiple decoy mobile phones. For instance, the AGA may send periodic control messages such as dynamic host configuration protocol (DHCP) messages, ping messages, address resolution protocol (ARP) messages, etc., to check the signal power level and direction (via cooperating base station antennas/remote radio heads (RRHs)) and to identify if traffic sources are at the same location (or are very close, such as to be indistinguishable in location, or the like). In particular, the present disclosure may identify as a potentially unrealistic situation for two sources of media streams being located in the same spot. For example, this may indicate a web application that simulates multiple phones to make fraudulent calls, and/or a laptop that is turned on to generate nonsense traffic into the independent gateway to earn rewards.

Alternatively, or in addition, the AGA may process network traffic data from core network elements (such as access management functions (AMFs), domain name system (DNS) servers, etc.) to identify multiple streams that may be going to/originating from the same server, which may be indicative of collusion. For instance, the AGA may apply signatures of patterns of uplink requests to identify repetitive behavior. For example, elements of DNS queries (e.g., server name identification (SNI)) or similar parameters may be sent on the clear, and can identify traffic for a single domain/server that may potentially belong to or which may be otherwise associated with a malicious entity. In one example, the AGA may combine these or other indicators to identify potential violations. For instance the AGA may comprise a machine learning model that may have predictors such as the above features and/or others features, and which may output an indicator of fake network utilization.

In one example, a determination by the AGA of a violation may cause the reward for the independent gateway to be capped to a pre-set or dynamic limit. In one example, a detected violations may also result in automatically assigning a reduced priority level to communications for one or more endpoint devices associated with the fake network usage, e.g., during times of congestion. Thus, for example, in times of network congestions, traffic for these endpoint devices may be preferentially deprioritized. In one example, a detected violation and/or repeated violations may result in disabling access to the telecommunication network via the independent gateway. In one example, a notification may be made to endpoint devices detected to be associated with the fake network usage (or to accounts associated with such endpoint devices). For instance, the notification may be a warning of the detected association with the violation and of potential escalated remedial actions. However, in some cases, endpoint devices may be infected with malware (or greyware applications (apps)) that may be configured to drive spurious traffic from the device through one or more independent gateways. Thus, the notification may inform an endpoint device owner of a potential compromise of the device. These and other aspects of the present disclosure are described in greater detail below in connection with the examples of FIGS. 1-3.

Figure 1:
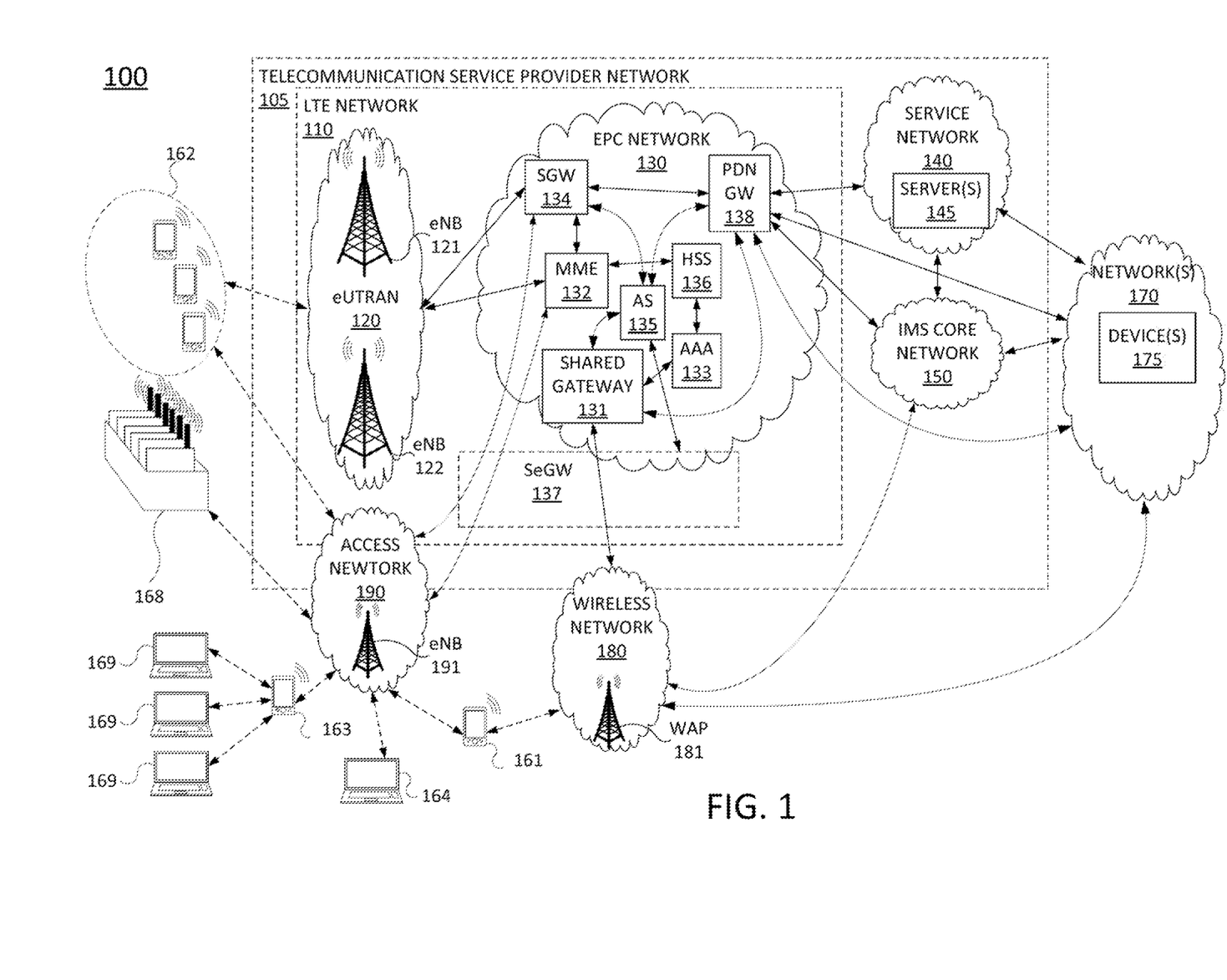
FIG. 1 illustrates an example system related to the present disclosure.

To aid understand the present disclosure, FIG. 1 illustrates an example network, or system 100 in which examples of the present disclosure may operate. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint devices 161-164 with server(s) 145 in service network 140, with devices 175 in networks 170, and/or with other components of telecommunication service provider network 105. The endpoint devices 161-164 may each comprise a cellular telephone, a smartphone, a tablet computing device, a laptop computer, a pair of computing glasses, a wireless enabled wristwatch, or any other wireless and/or cellular-capable mobile telephony and computing devices (broadly, a "mobile endpoint device"). In one example, the endpoint devices 161-163 may each comprise a device of a subscriber or customer of the telecommunication service provider network 105. Additional devices such as a "SIM box" 168 and laptop computers 169 illustrated in FIG. 1 are described in greater detail below.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161-164, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks and the like.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161-164 (this may also include information on subscriber identity modules (SIMs) in SIM box 168). HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

Figure 3:
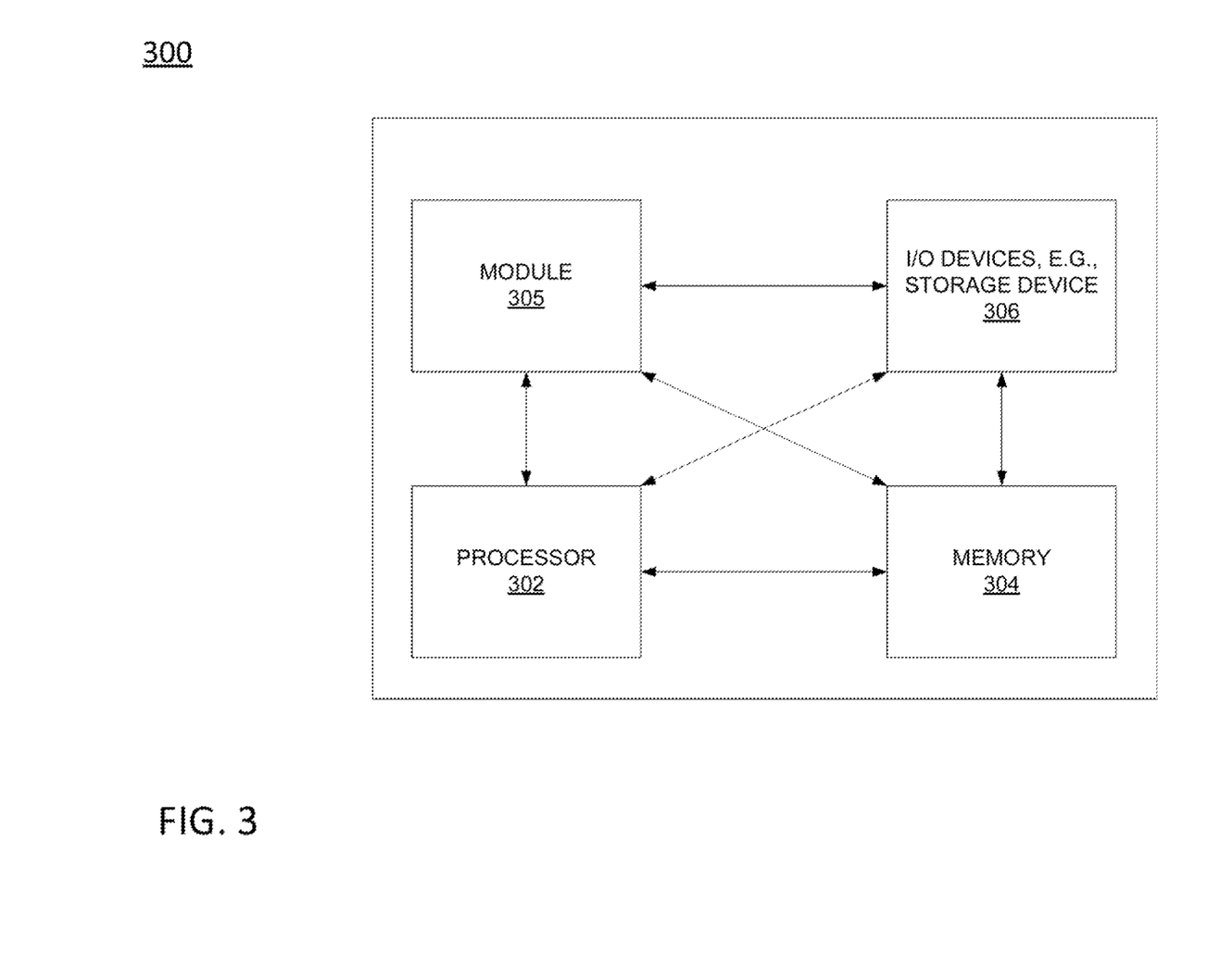
FIG. 3 illustrates an example high-level block diagram of a computing device specifically programmed to perform the steps, functions, blocks, and/or operations described herein.

In one example, system 100 may also include an application server (AS) 135. In one example, application server 135 may comprise computing device or processing system, such as computing system 300 depicted in FIG. 3, specifically configured to provide one or more functions for determining fake network usage associated with an independent gateway from an input data set associated with network traffic data of the independent gateway via at least a first detection model, in accordance with the present disclosure. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

In one example, service network 140 may comprise one or more devices, such as server(s) 145 for providing services to subscribers, customers, and/or users. For example, telecommunication service provider network 105 may provide a cloud storage service, web server hosting, and other services. As such, service network 140 may represent aspects of telecommunication service provider network 105 where infrastructure for supporting such services may be deployed. It should be understood that service network 140 may include any number of components to support one or more services that may be provided to one or more subscribers, customers, or users by the telecommunication service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, a peer network (e.g., a cellular network and/or LTE network of a different telecommunication service provider), and the like. In one example, the networks 170 may include different types of networks. In another example, the networks 170 may be the same type of network. In one example, the networks 170 may represent the Internet in general. Devices 175 may include servers, such as web servers, storage devices, enterprise servers, email servers, and so forth. Devices 175 may also include personal computers, desktop computers, laptop computers, personal digital assistants (PDAs), tablet computing devices, endpoint devices of a same or a similar nature as endpoint devices 161-164, or any other devices for wireless and/or wired communications. In one example, endpoint devices 161-164 may communicate with devices 175 in networks 170 via PDN GW 138 and/or via PDN GW 138 and IMS core network 150, e.g., for voice over LTE (VoLTE)-based calls or Wi-Fi calling.

In one example, system 100 may also include an access network 190 with an eNodeB (eNB) 191, e.g., an "independent gateway," which may comprise an antenna unit and/or baseband unit, or the like. The eNodeB 191 may comprise, for example, a home eNodeB (HeNB), a "small cell," such as a femtocell, a microcell, etc., and/or a "low power" eNodeB. For instance, eNB 191 may have a range of 2 kilometers or less, while eNodeBs 121 and 122 may have a range of up to 35 kilometers or more. In one example, eNB 191 may operate in a designated citizens broadband radio service (CBRS) spectrum (e.g., in the United States, this may comprise a 3.5 GHz band (3550-3700 MHz)). In one example, eNB 191 may utilize at least a portion of this spectrum in accordance with a registered priority access or general authorized access according to a spectrum access system (SAS). In one example, access network 190 and eNB 191 may connect to EPC network 130 via a subscriber/customer broadband connection. For instance, access network 190 may comprise a home network of a customer/subscriber and eNodeB 191 may connect via a home gateway (not shown) or similar equipment deployed at the customer premises to SGW 134 and MME 132 in EPC network 130, e.g., via S1 interfaces. While access network 190 may comprise a home network, eNodeB 191 may continue to be managed by a telecommunication service provider network 105, or may be managed by a customer/subscriber associated with access network 190.

In one example, access network 190 and eNodeB 191 may further connect to SGW 134 and MME 132 via a security gateway (SeGW) 137. SeGW 137 may provide an anchor point for secure communications between eNodeB 191 and EPC network 130. In particular, since access network 190 may comprise a customer premises, it may be more vulnerable to attack and compromise, and may provide a vector for entry into telecommunication service provider network 105 and EPC network 130. Thus, in one example, SeGW 137 may establish an IP security (IPsec) tunnel between itself and the eNodeB 191. The SeGW 137 may comprise a firewall or perform similar functions to analyze and filter traffic from eNodeB 191 before passing the traffic to SGW 134 or MME 132, or alternatively dropping the traffic or passing the traffic to a quarantine device or other network based devices, e.g., for further analysis, malicious traffic signature generation, temporary network-based storage, and so forth.

In one example, EPC network 130 may also include a shared gateway 131. In one example, shared gateway 131 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 131 may comprise a device that is configured to provide functions of all of an ePGD, a TWAP and a TWAG. In one example, ePDG functionality of the shared gateway 131 may process traffic from endpoint devices accessing the EPC network 130 via untrusted wireless networks (e.g., IEEE 802.11/Wi-Fi networks), while TWAP/TWAG functionality of shared gateway 131 may process traffic from endpoint devices accessing the EPC network via trusted wireless networks (e.g., IEEE 802.11/Wi-Fi networks). For example, wireless access point (WAP) 181, in wireless network 180 may represent an untrusted WAP. Thus, wireless network 180 may comprise an untrusted wireless network. In one example, WAP 181, e.g., a wireless router that may communicate with endpoint device 161 via an IEEE 802.11/Wi-Fi based link, connects to shared gateway 131 via an S2b interface. In addition, in one example, endpoint device 161 may be connected to shared gateway 131 via a secure tunnel, e.g., an IPsec tunnel, wherein traffic carried via the secure tunnel is passed via the WAP 181, but is indecipherable to the WAP 181. For example, the payload data may be encrypted using an encryption key, or keys, which may be held by endpoint device 161 and shared gateway 131, but which WAP 181 does not possess. In one example, the secure tunnel between the endpoint device 161 and shared gateway 131 may comprise a SWu interface.

In another example, WAP 181 may represent a trusted WAP. Thus, wireless network 180 may comprise a trusted wireless access network. In such an example, WAP 181 may connect to shared gateway 131 via an S2a interface. For instance, the link between WAP 181 and shared gateway 131 may also comprise an IPsec tunnel. However, it should be noted that the IPsec tunnel terminates at WAP 181 and not at the endpoint device 161, in contrast to the example where WAP 181 is untrusted, where a secure tunnel is established between the shared gateway 131 and endpoint device 161.

Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. In one example, wireless network 180 and WAP 181 may be untrusted insofar as wireless network 180 may comprise a home network of a subscriber of telecommunication service provider network 105. For instance, communication equipment at a residential customer premises may, in general, be more susceptible to tampering and other types of information security breaches as compared to communication infrastructure that is under the control of an operator of telecommunication service provider network 105. In addition, in one example, a trust designation of a WAP or wireless access network may be changed, e.g., from "trusted" to "untrusted," based upon various events, such as an invalidity of a security certificate of a WAP, a detection of a port opening at the WAP, and so forth.

In one example, wireless network 180 may further be connected to shared gateway 131 via SeGW 137. For instance, in one example, SeGW 137 may serve as an anchor point for secure communications between EPC network 130 and external devices. Thus, in another example, a secure tunnel (e.g., an IPsec tunnel) may be established between WAP 181 and SeGW 137, e.g., instead of a secure tunnel being established between trusted WAP 181 and shared gateway 131. Similarly, a secure tunnel may be established between endpoint device 161 and SeGW 137, e.g., instead of a secure tunnel between endpoint device 161 and shared gateway 131. It should be noted that SeGW 137 may comprise a component of EPC network 130, or may comprise a component of LTE network 110 that is considered to be external to the EPC network 130. It should also be noted that in one example, SeGW 137 or shared gateway 131 may perform the above described functions based upon instructions executed locally on such devices. However, in another example, SeGW 137 and/or shared gateway 131 may perform such functions under the instructions of AS 135.

In one example, AS 135 may be configured and deployed in the system 100 as shown to perform various operations for determining fake network usage associated with an independent gateway from an input data set associated with network traffic data of the independent gateway via at least a first detection model, in accordance with the present disclosure. For instance, AS 135 may obtain network traffic data associated with an independent gateway that is connected to the telecommunication network (e.g., eNB 191). The network traffic data may be obtained from elements of telecommunication service provider network 105, such as PDN GW 138, SGW 134, SeGW 137, and so forth. For instance, these network elements may collect call detail records (CDRs), flow records, and other information which may be forwarded to AS 135 and/or which may be retrieved by AS 135 from such network elements. Alternatively, or in addition, AS 135 may access network traffic data from a record store, e.g., a database system hosted via one or more devices of telecommunication service provider network 105, such as server(s) 145.

To illustrate, SGW 134, SeGW 137, and/or PDN GW 138 may track and categorize packets or other quantities of traffic as belonging to particular flows, e.g., traffic between IP address/port pairs. For instance SGW 134, SeGW 137, and/or PDN GW 138 may label flows with a hash value or the like, and may maintain and update various statistics regarding each flow, such as a volume of outbound or inbound data usage, an average bandwidth utilization for the flow over an incoming or outgoing network link, inter-packet arrival times for the flow, and so forth. In one example, SGW 134, SeGW 137, and/or PDN GW 138 may report aggregate statistics for different flows to AS 135, e.g., periodically or on on-demand basis. For instance, SGW 134, SeGW 137, and/or PDN GW 138 may send aggregate reports every 30 seconds, every minute, every five minutes, etc. In one example, AS 135 may further store and compile data from aggregate reports, e.g., over a time period of a day, a week, a month, etc. Alternatively, or in addition, in one example SGW 134, SeGW 137, and/or PDN GW 138 may forward traffic (e.g., outbound traffic) for endpoint devices connecting to EPC network 130 via access network 190, to AS 135 for inspection and analysis on an ongoing basis.

In one example, AS 135 may apply an input data set associated with the network traffic data of the independent gateway to at least a first detection model implemented by AS 135 for detecting fake network usage. Accordingly, in one example, AS 135 may determine fake network usage associated with the independent gateway from the input data set associated with the network traffic data of the independent gateway via the at least the first detection model. In response, AS 135 may further generate an alert of the fake network usage associated with the independent gateway in response to the determining. The alert may be transmitted to one or more elements of telecommunication service provider network 105, such as SeGW 137, AAA server 133, and so forth. In one example, the alert may be transmitted to one or more endpoint devices determined to be associated with detected fake network usage via eNB 191.

The at least one detection model may comprise, for example, a first machine learning model having a plurality of predictors associated with the network traffic data and an output comprising a fake network usage indicator. In one example, the at least one detection model may comprise a plurality of machine learning models, e.g., in a multi-model machine learning system, or a hybrid machine learning system. For instance, one or more detection models in a first stage may generate predictors/inputs for a next stage detection model. For instance, a first model may cluster content usage, a second model may detect a types of traffic from encrypted streams, etc. In a next stage, a (third) model may take the other predictors as inputs and may output a fake network usage indicator. Other predictors may be features that are generated from the network traffic data via artificial intelligence (AI) or other processing techniques. For instance, raw network traffic data may be aggregated, averaged, etc. Then engineered features or "constructed features" may be derived, such as a number of simultaneous streams of a same stream type per device, and so forth.

In one example, the detection model(s) may comprise one or more machine learning algorithms (MLAs) and/or trained MLAs, e.g., MLMs that are trained with training data for various purposes, such as prediction, classification, etc. It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other clustering and/or classification models may be implemented in examples of the present disclosure, including time-series clustering algorithms, such as k-means clustering or variants thereof (e.g., partitioning around medioids (PAM), k-medioid, etc.), density-based spatial clustering of applications with noise (DB-SCAN), and so forth.

To further illustrate, in one example, endpoint device 161 may be a source of fake network usage via eNB 191. For instance, endpoint device 161 may be configured by a user to continuously download large video files, e.g., from devices(s) 175 over network(s) 170, telecommunication service provider network 105 and access network 190, including eNB 191. Similarly, a user may manually control device 161 to continue to stream and/or download videos or other media, or other files or programs, on a relatively constant basis, e.g., with only small interruptions to click on a next video program, for example. In one example, the network traffic data may indicate statistics and other features such as: a total volume of data traffic in a sliding time window, total data traffic volumes in time blocks within the sliding time window (e.g., total data usage over 30 minute intervals for 2 weeks), peak and average data rates in the time blocks (e.g., peak and average data rates for 30 minute intervals over 2 weeks), total number of idle minutes or idle time blocks (e.g., 30 minute intervals) over 12 hour periods, 24 hour periods or the like, idle time percentages for successive time periods within the sliding time window, traffic type percentages for each time block within the time window, overall traffic volume per traffic type (e.g., 90% video, 5% general app usage, 4% calls, 1% text message, etc.), percent time overall connected to eNB 191 versus other access points, a ratio of data usage when connected to other access points versus when connected to eNB 191, and so forth. Alternatively, or in addition, the network traffic data may include a volume of content reuse by endpoint device 161, a number of simultaneous streams of a same content type for endpoint device 161, location data of endpoint device 161 (e.g., which may indicate that device 161 is relatively stationary, does not move from a location of attachment via eNB 191, etc.), and so on.

In one example, the detection model may be applied by AS 135 with respect to individual endpoint devices, such as endpoint device 161. However, in addition, the at least one detection model may also be applied by AS 135 with respect to network traffic data/flows associated with multiple endpoint device (or network traffic data related to what appear to be multiple endpoint devices). For instance, AS 135 may collect network traffic data relating to all endpoint devices utilizing eNB 191 over a sliding time window, the top endpoint devices by traffic volume (e.g., the top 30 devices, the top 50 devices, etc.). In one example, the at least one detection model may be configured to look for any group of endpoint devices that have the same location(s) and/or similar network usage patterns in excess of threshold(s). For instance, the at least one detection model may look at content overlap among a cluster of endpoint devices accessing the content via eNB 191, a number of simultaneous streams per device (which may indicate excess tethering and/or video or other content streams that are not for user consumption, etc.).

In one example, the location data of endpoint devices may be obtained from the eNB 191. For instance, eNB 191 may remain under the control of telecommunication service provider network 105, but may be deployed, owned, and physically possessed by a user or a different entity, such as a business, educational institution, etc., and which may earn rewards for the user/entity per agreement with the telecommunication service provider network 105. Alternatively, or in addition, the location data may be estimated via triangulation, time difference of arrival (TDOA), and/or similar techniques from nearby access points, such as eNB 121, eNB 122, and other eNBs (not shown), etc.

In the example of FIG. 1, a cluster of devices having the same location(s) may include endpoint device 163 and laptop computers 169 (e.g., additional endpoint devices that may not have independent connections to an access network). For instance, endpoint device 163 may comprise a cellular telephone in tethering/hotspot mode serving laptop computers 169. Accordingly, AS 135 may obtain network traffic data that indicates a plurality of streams via device 163, and which are hence associated with the same location. In addition, via the at least one detection model, AS 135 may determine that endpoint devices in this cluster have similar usage patterns, e.g., excess/high utilization in terms of data volume, duration of time consuming high bandwidth, etc. The similar usage patterns may also include as accessing the same content (e.g., content reuse), or the like. In one example, the network traffic data may indicate more streams than endpoint devices for the cluster, which may be further indicative of a fake network usage as an input to the at least one detection model.

Similarly, in another example, endpoint devices 162 may be configured to generate fake network traffic. For instance, being under the control of a same malicious user or entity associated with eNB 191, endpoint devices 162 may have the same or similar locations and patterns of usage that are identifiable in the network traffic data. For example, endpoint devices 162 may all have high bandwidth utilizations over sustained periods of time (e.g., beyond what could be considered normal usage even for heavy users, such as very high usage during daytime hours as well as night time hours in the locale, etc.), the group of endpoint devices 162 may exhibit similar content reuse, and so forth.

In still another example, a malicious entity associated with eNB 191 may cause fake network usage to be driven through the eNB 191 using a SIM box 168, or the like. The location(s) and usage patterns may be the same or similar as that of the group of endpoint devices 162, for example. Likewise, in one example, endpoint device 164, e.g., a laptop computer, may be configured to simulate multiple endpoint devices connecting via eNB 191, which may have location(s) and usage patterns similar to devices 162, SIM box 168, or the group of endpoint device 163 and endpoint devices 169.

Notably, in each case, fake network utilization may be indicated by sustained high bandwidth utilization and overall traffic volume. Fake network utilization is further indicated by an excess number of flows per device (e.g., a device engaged in downloading and/or streaming of two or more videos simultaneously), content reuse, as well as patterns across groups of devices (e.g., having the same or similar locations over time, and having same or similar usage patterns exhibiting sustained high bandwidth utilization and overall traffic volume). As such, these patterns indicative of potential fake network utilization may be detected by AS 135 via the at least one detection model, and an alert may be generated accordingly.

As noted above, when fake network utilization is detected, the alert may be transmitted to one or more elements of telecommunication service provider network 105, such as SeGW 137, AAA server 133, etc., to endpoint device(s) determined to be associated with detected fake network usage via eNB 191, and so forth. In one example, AS 135 may implement one or more remedial actions in response to the detection of the fake network utilization, such as assigning a reduced priority level to communications for one or more endpoint devices associated with the fake network usage (e.g., during times of congestion), disabling access to the telecommunication network via eNB 191, capping a reward for data usage via eNB 191 that is above threshold, removing data usage of endpoint devices associated with the fake network usage from reward compensation, disabling access to the telecommunication network 105 via eNB 191 (e.g., for repeat violations or the like), and so forth. In one example, AS 135 may implement remedial actions via instructions to other network elements. For example, SeGW 137, SGW 134, and/or PDN GW 138 may be instructed de-prioritize traffic for offending endpoint devices attached via eNB 191. For instance, packets/flows may be tagged with different priority labels by such devices. Similarly, AAA server 133 may be instructed to offset credits of an account of an owner of eNB 191, and so forth.

Additional operations of AS 135 are described in greater detail below in connection with the example method 200 of FIG. 2.

Although the foregoing is described primarily in connection with detection and remediation of fake network usage via eNB 191, e.g., an independent gateway, it should be noted that in other, further, and different example, the same or similar principles may apply in the case of cellular offloading, e.g., to IEEE 802.11/Wi-Fi access points or the like. For instance, telecommunication service provider network 105 may engage various independent entities to deploy Wi-Fi hotspots, and may offer compensation/reward for traffic offloaded from the cellular network in proportion to the quantities of data carried via the W-Fi hotspots. Thus, for example, fake network usage via WAP 181 of wireless network 180 may be similarly detected and addressed. Accordingly, it should be noted that the foregoing examples are provided by way of illustration only.

It should also be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN), and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, SeGW 137, shared gateway 131, and/or SGW 134 may be combined into a single component or into two components. Alternatively, or in addition, AS 135 may be integrated with any one or more of such components. In another example, AS 135 may be combined with AAA 133 and/or HSS 136. In still another example, shared gateway 131 may be separated into respective components of an ePDG, a TWAP, and a TWAG. In addition, various elements of eUTRAN 120, EPC network 130, and IMS core network 150 may be omitted for clarity, including gateways or border elements providing connectivity between such networks. Similarly, due to the relatively large number of connections available between devices in the system 100, various links between AS 135, shared gateway 131, SeGW 137, MME 132, SGW 134, AAA server 133, HSS 136, eNodeBs 121 and 122, PDN GW 138, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 5G network (e.g., a standalone (SA) 5G network), an LTE/5G hybrid network (e.g., a non-standalone (NSA) 5G network), a 3G network, and the like, or a future technology or standard-based network). Similarly, although the shared gateway 131, AS 135, HSS 136, AAA server 133, and SeGW 137 are illustrated as components within EPC network 130 having a particular configuration, in other examples, any one or more of these components may be deployed in a different configuration. For example, HSS 136 and/or AAA server 133 may be deployed in IMS core network 150, SeGW 137 may reside external to EPC network 130 within LTE network 110, and so on. Thus, these and other modifications are all contemplated within the scope of the present disclosure.

Figure 2:
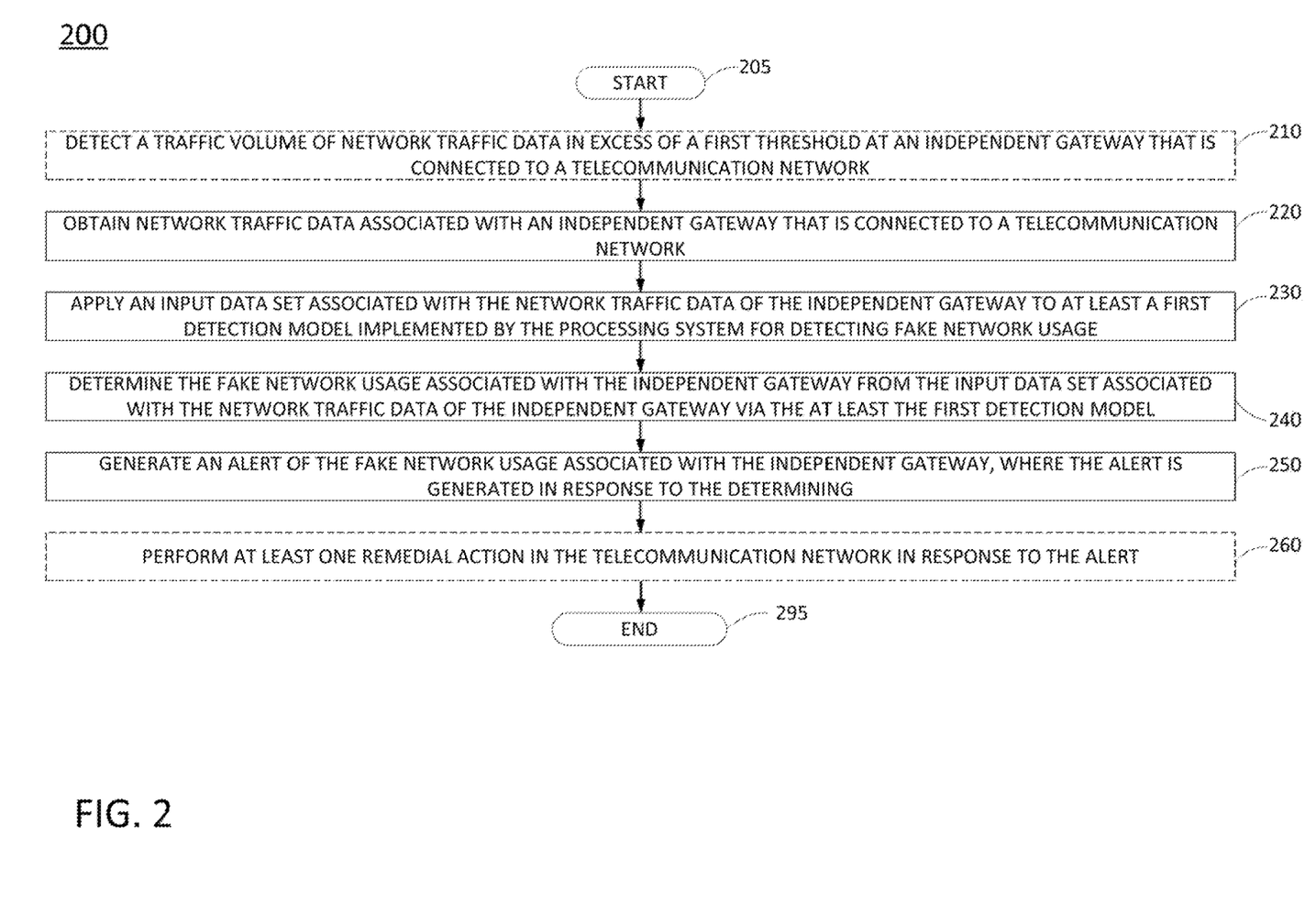
FIG. 2 illustrates a flowchart of an example method for determining fake network usage associated with an independent gateway from an input data set associated with network traffic data of the independent gateway via at least a first detection model.

FIG. 2 illustrates a flowchart of an example method 200 for determining fake network usage associated with an independent gateway from an input data set associated with network traffic data of the independent gateway via at least a first detection model, in accordance with the present disclosure. In one example, steps, functions and/or operations of the method 200 may be performed by one or more components of the example system 100, e.g., a server, such as AS 135 in FIG. 1, a gateway device such as SeGW 137, PDN GW 138, SGW 134, shared gateway 131, etc. or any one or more components thereof (e.g., a processor, or processors, performing operations stored in and loaded from a memory or distributed memory system) or AS 135 in conjunction with other components of the system 100 such as SeGW 137, PDN GW 138, and/or SGW 134, shared gateway 131, and so on. In one example, the steps, functions, or operations of method 200 may be performed by a computing device or processing system, such as computing system 300 and/or a hardware processor element 302 as described in connection with FIG. 3 below. For instance, the computing system 300 may represent at least a portion of a platform, a server, a system, and so forth, in accordance with the present disclosure. In one example, the steps, functions, or operations of method 200 may be performed by a processing system comprising a plurality of such computing devices as represented by the computing system 300. For illustrative purposes, the method 200 is described in greater detail below in connection with an example performed by a processing system (e.g., deployed in a telecommunication network). The method begins in step 205 and may proceed to optional step 210 or to step 220.

At optional step 210, the processing system may detect a traffic volume of network traffic data in excess of a first threshold at an independent gateway that is connected to a telecommunication network (e.g., an overall traffic volume via the independent gateway, such as in a first sliding time window, e.g., in a 24 hour period, a 48 hour period, a one week period, or the like). In one example, the independent gateway provides endpoint devices access to the telecommunication network, e.g., a cellular core network. For instance, from the perspective of the endpoint devices, the independent gateway may be a candidate network attachment point as any other cellular base station. However, the independent gateway may be deployed, owned, and physically possessed by a user or entity other than the telecommunication network operator. For instance, the independent gateway may comprise a home eNodeB (HeNB), a "small cell," such as a femtocell, a microcell, etc., and/or a "low power" eNodeB. In one example, the independent gateway may operate in a designated CBRS spectrum. In one example, the independent gateway may earn rewards for the user/entity per agreement with the telecommunication service provider network. In one example, the threshold of 210 may be a trigger for further evaluation of whether the independent gateway is facilitating fake network utilization (e.g., in coordination with endpoint devices driving the fake network traffic in order to increase the reward). The traffic volume may be reported by one or more network elements, such as an SGW, a PGW (or PDNGW), an SeGW, etc., and/or by the independent gateway itself. In another example, the processing system may collect the network traffic data and may initially identify the volume of traffic over a sliding time window, e.g., the past 48 hours, the past 72 hours, the past week, etc.

At step 220, the processing system obtains network traffic data associated with the independent gateway that is connected to the telecommunication network. For instance, the network traffic data may be gathered and stored in connection with optional step 210, and may be retrieved by the processing system for further evaluation. Alternatively, or in addition, the network traffic data may be obtained from one or more network elements, such as an SGW, a PGW (or PDNGW), an SeGW, etc., and/or by the independent gateway itself.

At step 230, the processing system applies an input data set associated with the network traffic data of the independent gateway to at least a first detection model implemented by the processing system for detecting fake network usage. In one example, the input data set may be associated with a plurality of predictors of at least a first detection model for detecting fake network usage. For instance, the input data set may include raw features of the network traffic data and/or "engineered features," "constructed features," and so forth derived from the network traffic data. For example, features may include a total volume of data traffic in a sliding time window, total data traffic volumes in time blocks within the sliding time window (e.g., total data usage over 30 minute intervals for 2 weeks), peak and average data rates in the time blocks (e.g., peak and average data rates for 30 minute intervals over 2 weeks), total number of idle minutes or idle time blocks (e.g., 30 minute intervals) over 12 hour periods, 24 hour periods or the like, idle time percentages for successive time periods within the sliding time window, traffic type percentages for each time block within the time window, overall traffic volume per traffic type (e.g., 90% video, 5% general app usage, 4% calls, 1% text message, etc.), percent time overall connected to the independent gateway versus other access points, a ratio of data usage when connected to other access points versus when connected to the independent gateway, and so forth. Alternatively, or in addition, the input data set may include a volume of content reuse by one or more endpoint devices, a number of simultaneous streams of a same content type for one or more endpoint devices, location data of one or more endpoint devices, and so on. Accordingly, in one example, step 230 may include generating one or more features. Alternatively, or in addition, engineered, constructed, and/or generated features may be created at other network elements, stored as such in one or more database systems, etc., and obtained by the processing system. In one example, a first input of the input data set may comprise a measure of a number of endpoint devices of a first endpoint device type accessing the telecommunication network via the independent gateway and having download streams in excess of threshold bitrate over the sliding time window. For instance, the first endpoint device type may comprise a mobile smartphone endpoint device type. In one example, different metrics may be associated with different endpoint device types, such cellular enabled laptop computer, tablet computers, "smart glasses" and other wearable computing devices, and so forth.

At step 240, the processing system determines fake network usage associated with the independent gateway from the input data set associated with the network traffic data of the independent gateway via the at least the first detection model. In particular, the fake network usage may comprise excess network traffic data that is not for an authorized productive purpose. For instance, productive purposes may be streaming or downloading video, audio, or other media for intended user consumption, sending or receiving emails or text messages, engaging in voice or video calls, playing a video game, working on documents or other files in a cloud desktop and/or a shared workspace, obtaining files for reconfiguring an endpoint device (e.g., software updates, new applications or features, etc.), and so forth. In contrast, the fake network usage may comprise traffic that is generated solely or primarily to drive excess traffic via the independent gateway for increased reward, e.g., an unauthorized purpose. For instance, this could include one or more endpoint devices continuously downloading copies of a same high-definition video program that will not be watched (or that may or could be watched once, where repeated downloads are clearly not necessary). This could also include using the independent gateway as launching point for a denial-of-service (DoS) attack, while simultaneously increasing traffic via independent gateway for reward purposes, or the like.

In one example, the at least the first detection model may be for detecting a content reuse at the independent gateway. In other words, the at least the first detection model is configured and/or trained to detect content reuse (e.g., a machine learning model that is configured with selected hyperparameters and trained with a training data set and/or via reinforcement learning, or the like). In one example, content may be identified by URL, server address (e.g., IP address), and so forth. It should be noted that content reuse in and of itself may not constitute fake network usage. For instance, a user may simply like the same video and watch it again. However, repeated access of the same content over the course of days is not realistic for streaming. Likewise, repeated downloads of the same video is not realistic (e.g., over hours or some lesser time period, because in most cases the user would already possess the video from a first download and not need to continuously re-download). In one example, the content reuse may be a pattern over multiple colluding endpoint devices, in which the endpoint devices have a similar pattern (or patterns) of video or other content access. They may not be the same videos in the same order, for example, but may be randomly selected from the same pool of videos, which over time, may show correlations that can be revealed via at least the first detection model (e.g., a machine learning model). For instance, the at least the first detection model may include a clustering algorithm that clusters endpoint devices based on content accessed. Next, a top cluster or clusters may be identified in terms of the overall data volume over a sliding time window. In addition, locational overlap for any such endpoint devices may be identified, which may be further indicative of collusion, particularly when remaining predominantly in a coverage zone of the independent gateway.

Alternatively, or in addition, in one example, the at least the first detection model may be for detecting a number of simultaneous streams of a same content type for each of a plurality of endpoint devices connected to the telecommunication network via the independent gateway. For instance, the at least the first detection model may comprise signatures and/or may apply signatures for identifying audio streams, video streams, etc. in encrypted traffic (e.g., in general terms only without accessing the actual data contents). In one example, for an endpoint device that is not serving as a hotspot (e.g., not in a tethering mode), two video streams to the same device or two audio streams to the same device may be unrealistic. In addition, three of the same is even more likely to be unrealistic. With tethering, the realistic number of streams may also be capped, e.g., with a maximum of three tethered devices, it is expected that a maximum of four video or audio streams would be seen in the network traffic data from the same hotspot. Similar to the above, this in and of itself may not constitute fake network usage, since it is possible that the user is simply tethering too many devices (which is a related, but separate problem). Fake network usage may include too many streams, but also that the data volume is unrealistic for actual user consumption, that the endpoint devices involved do not move much if at all from the coverage of the independent gateway, and so forth.

In one example, the at least the first detection model may alternatively or additionally be for detecting a number of simultaneous streams via the independent gateway associated with endpoint devices in a same location (e.g., very close, such as where locational accuracy cannot place two devices in unique locations, or within a geofence, such as within 50 feet, etc. such as being within the same house, apartment, etc.). It should again be noted that this in and of itself may not constitute fake network usage, since it is possible that there is a family with multiple phones, or the like. For instance, fake network usage may be further indicated when the data volume is unrealistic for actual user consumption, where the endpoint devices (or apparently unique endpoint devices) do not significantly move out of the range of the independent gateway, and so on.

In one example, the at least one detection model may comprise a formula combining one or more of the above factors and/or others, such as: $A^*$(a number of excess streams across all devices)+$B^*$(a number of static devices)+$C^*$(a number of devices at a same location)+$D^*$(a number of content items repeated three or more times)+$E^*$(a number of content items repeated five or more times), with the sum providing a value indicative of a likelihood that the network traffic data comprises the fake network usage. For instance, this approach may look at the independent gateway holistically.

In one example, the at least the first detection model may comprise at least a first machine learning model having a plurality of predictors associated with the network traffic data and an output comprising a fake network usage indicator. For instance, the fake network usage indicator may comprise a value indicative of a likelihood that the network traffic data comprises the fake network usage (e.g., a score, a binary output, or a multi-class output (e.g., 1-5, highly likely, likely, neutral, unlikely, highly unlikely), etc.). In one example, the at least the first detection model may comprise a plurality of detection models, where at least a second detection model of the plurality of detection models is for generating at least one of the plurality of predictors from the network traffic data (e.g., multi-model machine learning, or hybrid machine learning). For example, a first model may cluster content usage, a second model may detect a type of traffic from an encrypted stream, and so forth. In addition, a (third) model may take the other predictors as inputs and may output the fake network usage indicator. In one example, at least a portion of the predictors may be identified via one or more of the above detection models, and may include: one or more measures of content reuse at the independent gateway (e.g., overall content reuse, measures of content reuse per content item, such as for the top 50 content items accessed via the independent gateway, the top 100 content items, etc., and so forth), a number of simultaneous streams of a same content type for each of a plurality of endpoint devices connected to the telecommunication network via the independent gateway, a number of simultaneous streams via the independent gateway associated with endpoint devices in a same location, and so forth. Other predicators may be features that are generated from the network traffic data via AI or other processing techniques. For instance, raw network traffic data may be aggregated, averaged, etc. Alternatively, or in addition, engineered features or "constructed features" may be derived. For instance, a number of simultaneous streams of a same content type per endpoint device may comprise a "constructed feature." In various examples, the at least one detection model (e.g., one or more machine learning models) may adapt to identify aspects of the network traffic data that is/are indicative of fake network usage, such as repetitive accessing of a same content (e.g., where the number of repetitions that is suspicious may be different depending on the video length), groups of endpoint devices that have same locations and similar network usage patterns in excess of a threshold, bot usage patterns (e.g., constant data usage including during typical overnight hours in a locale), simultaneous video streams on a single endpoint device over extended periods of time (and over multiple endpoint devices), and so on.

At step 250, the processing system generates an alert of the fake network usage associated with the independent gateway, where the alert is generated in response to the determining of the fake network usage at step 240. The alert may be transmitted to one or more elements of telecommunication network, such as an SeGW, an SGW, a PDN GW, an AAA server, and so forth. In one example, the alert may be transmitted to one or more endpoint devices determined to be associated with the fake network usage detected at step 240. For instance, endpoint devices may be generating fake network usage in accordance with malware that the device owners may be unaware of. Alternatively, or in addition, a warning to a malicious user or entity may deter future attempts at revenue generation via fake network usage. Similarly, the alert may be transmitted to an owner or operator of the independent gateway (e.g., as a warning and/or deterrent).

At optional step 260, the processing system may perform at least one remedial action in the telecommunication network in response to the alert (and/or in response to the determining of the fake network usage). For instance, the at least one remedial action may comprise assigning a reduced priority level to communications for one or more endpoint devices associated with the fake network usage, disabling access to the telecommunication network via the independent gateway, or the like. In one example, the at least one remedial action may comprise capping a reward associated with a data volume via the independent gateway that is above a threshold, removing data usage of endpoint devices associated with the fake network usage from a reward compensation calculation, or the like. In one example, the alert of step 250 may specify that one or more such remedial actions are, will, or may be applied in response to the detection of the fake network usage.

Following step 250 or optional step 260, the method proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 220-230 and/or steps 220-250 for additional sliding time windows, etc. In one example, step 220 may precede optional step 210. For instance, the exceeding of the threshold may be determine from network traffic data that is already obtained by the processing system. In one example, the method 200 may gather network traffic data relating to two or more independent gateways to look for fake network usage patterns. For example, a malicious entity may deploy a SIM box to two different independent gateways and take turns driving traffic to each, e.g., so as to attempt to avoid the cluster of SIMs from being detected as a source of excessive traffic at a single independent gateway. Thus, network traffic data of multiple independent gateways, e.g., of a same owner, may be considered in conjunction with one another. In one example, the method 200 may include training the one or more detection models, e.g., via training data set(s) and or reinforcement learning.

In one example, nearly constant usage may be categorically be considered to be fake network usage. For instance, a constant stream in excess of 2.9 Mbps, e.g., relatively constant 720p video or greater, over a period of 24 hours, 36 hours, etc. may be flagged as fake network usage. In one example, different categorical thresholds may be set for different device types and/or the capabilities of such devices (e.g., maximum screen resolution, storage capacity, battery capacity, etc.). For instance, for a mobile phone with 128 GB storage, 17 minutes of downloading at 1 Gbps will fill the device. Similarly, 1080 p video may typically utilize 40-80 Mbps bandwidth. Thus, for example, devices that exceed 200 GB in any one day (around the amount that would be consumed for 12 hours of continuous 1080 p video) may categorically be considered to be sources of fake network traffic (even if there is real traffic mixed in with the fake traffic, such as a user checking text messages and email messages while downloading video that goes unwatched). Likewise, devices that exceed 100 GB over any two days, 50 GB daily over any 7 days, any device that uses more than 500 GB in any month, etc. may be categorically flagged as sources of fake network traffic. In various other examples, different thresholds may be set at the discretion of the network operator, for instance.

It should be noted that in one example, certain endpoint devices and/or traffic streams for such endpoint devices may be exempt from evaluation. For instance, a user may have a subscription with the telecommunication network for continuous streaming of premises surveillance video from a camera via the independent gateway to a remote monitoring station over the telecommunication network. Thus, there may be a stream and/or endpoint device that appears to be of high data volume and bandwidth that is nearly continuous and from an unchanging location over the sliding time window. Thus, in one example, any such endpoint device or stream may be identified and specifically excluded from calculation of the data volume (e.g., at optional step 210), excluded from input to the at least one detection model at step 230, and so forth. It should be noted that although the foregoing is described primarily in connection with excess download traffic, the present disclosure (and the method 200) is equally applicable to upload traffic. For instance, a malicious entity may configure one or more endpoint devices as content servers, e.g., for high-definition video or the like, and place such endpoint device(s) in locations to attach to the telecommunication network via the independent gateway. The malicious entity may then control one or more remote endpoint devices to access content from the "content server," thus driving excess traffic/fake network utilization via the independent gateway. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing system 300 (e.g., a computing device or processing system) specifically programmed to perform the functions described herein. For example, any one or more components, devices, and/or systems illustrated in FIG. 1, or described in connection with FIG. 2, may be implemented as the computing system 300. As depicted in FIG. 3, the computing system 300 comprises a hardware processor element 302 (e.g., comprising one or more hardware processors, which may include one or more microprocessor(s), one or more central processing units (CPUs), and/or the like, where the hardware processor element 302 may also represent one example of a "processing system" as referred to herein), a memory 304, (e.g., random access memory (RAM), read only memory (ROM), a disk drive, an optical drive, a magnetic drive, and/or a Universal Serial Bus (USB) drive), a module 305 for determining fake network usage associated with an independent gateway from an input data set associated with network traffic data of the independent gateway via at least a first detection model, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 302 is shown, the computing system 300 may employ a plurality of hardware processor elements. Furthermore, although only one computing device is shown in FIG. 3, if the method(s) as discussed above is implemented in a distributed or parallel manner for a particular illustrative example, e.g., the steps of the above method(s) or the entire method(s) are implemented across multiple or parallel computing devices, then the computing system 300 of FIG. 3 may represent each of those multiple or parallel computing devices. Furthermore, one or more hardware processor elements (e.g., hardware processor element 302) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 302 can also be configured or programmed to cause other devices to perform one or more operations as discussed above. In other words, the hardware processor element 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 305 for determining fake network usage associated with an independent gateway from an input data set associated with network traffic data of the independent gateway via at least a first detection model (e.g., a software program comprising computer-executable instructions) can be loaded into memory 304 and executed by hardware processor element 302 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 302) executing the computer-readable instructions relating to the above described method(s) can be perceived as a programmed processor or a specialized processor. As such, the present module 305 for determining fake network usage associated with an independent gateway from an input data set associated with network traffic data of the independent gateway via at least a first detection model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   obtaining, by a processing system including at least one processor, network traffic data associated with an independent gateway that is connected to a telecommunication network;

applying, by the processing system, an input data set associated with the network traffic data of the independent gateway to at least a first detection model implemented by the processing system for detecting fake network usage;

determining, by the processing system, the fake network usage associated with the independent gateway from the input data set associated with the network traffic data of the independent gateway via the at least the first detection model; and generating, by the processing system, an alert of the fake network usage associated with the independent gateway, wherein the alert is generated in response to the determining.

2. The method of claim 1, further comprising:
performing at least one remedial action in the telecommunication network in response to the alert.

3. The method of claim 2, wherein the at least one remedial action comprises assigning a reduced priority level to communications for one or more endpoint devices associated with the fake network usage.

4. The method of claim 2, wherein the at least one remedial action comprises disabling access to the telecommunication network via the independent gateway.

5. The method of claim 1, further comprising:
detecting a traffic volume of the network traffic data in excess of a first threshold at the independent gateway, wherein the applying of the input data set associated with the network traffic data to the at least the first detection model is in response to the detecting of the traffic volume in excess of the first threshold.

6. The method of claim 1, wherein the independent gateway operates in a designated consumer broadband radio spectrum.

7. The method of claim 1, wherein the fake network usage comprises excess network traffic data that is not for an authorized productive purpose.

8. The method of claim 1, wherein the at least the first detection model is for detecting a content reuse at the independent gateway.

9. The method of claim 1, wherein the at least the first detection model is for detecting a number of simultaneous streams of a same content type for each of a plurality of endpoint devices connected to the telecommunication network via the independent gateway.

10. The method of claim 1, wherein the at least the first detection model is for detecting a number of simultaneous streams via the independent gateway associated with endpoint devices in a same location.

11. The method of claim 1, wherein the at least the first detection model comprises at least a first machine learning model having a plurality of predictors associated with the network traffic data and an output comprising a fake network usage indicator.

12. The method of claim 11, wherein the fake network usage indicator comprises a value indicative of a likelihood that the network traffic data comprises the fake network usage.

13. The method of claim 11, wherein the at least the first detection model comprises a plurality of detection models, wherein at least a second detection model of the plurality of detection models is for generating at least one of the plurality of predictors from the network traffic data.

14. The method of claim 11, wherein the input data set is associated with the plurality of predictors.

15. The method of claim 11, wherein the plurality of predictors comprises at least one of:
a number of simultaneous streams of a same content type for each of a plurality of endpoint devices connected to the telecommunication network via the independent gateway;
a volume of content reuse at the independent gateway; or
a number of simultaneous streams via the independent gateway associated with endpoint devices in a same location.

16. The method of claim 1, wherein the input data set is associated with a sliding time window of the network traffic data.

17. The method of claim 16, wherein a first input of the input data set comprises a measure of a number of endpoint devices of a first endpoint device type accessing the telecommunication network via the independent gateway and having download streams in excess of a threshold bitrate over the sliding time window.

18. The method of claim 17, wherein the first endpoint device type comprises a mobile smartphone endpoint device type.

19. A non-transitory computer-readable medium storing instructions which, when executed by a processing system including at least one processor, cause the processing system to perform operations, the operations comprising:
obtaining network traffic data associated with an independent gateway that is connected to a telecommunication network;
applying an input data set associated with the network traffic data of the independent gateway to at least a first detection model implemented by the processing system for detecting fake network usage;
determining the fake network usage associated with the independent gateway from the input data set associated with the network traffic data of the independent gateway via the at least the first detection model; and
generating an alert of the fake network usage associated with the independent gateway, wherein the alert is generated in response to the determining.

20. A device comprising:
a processor system including at least one processor; and
a computer-readable medium storing instructions which, when executed by the processing system, cause the processing system to perform operations, the operations comprising:
obtaining network traffic data associated with an independent gateway that is connected to a telecommunication network;
applying an input data set associated with the network traffic data of the independent gateway to at least a first detection model implemented by the processing system for detecting fake network usage;
determining the fake network usage associated with the independent gateway from the input data set associated with the network traffic data of the independent gateway via the at least the first detection model; and
generating an alert of the fake network usage associated with the independent gateway, wherein the alert is generated in response to the determining.

* * * * *